US006218988B1

(12) United States Patent
Maruta

(10) Patent No.: US 6,218,988 B1
(45) Date of Patent: Apr. 17, 2001

(54) ARRAY ANTENNA TRANSMITTER WITH A HIGH TRANSMISSION GAIN PROPORTIONAL TO THE NUMBER OF ANTENNA ELEMENTS

(75) Inventor: Yasushi Maruta, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/518,367

(22) Filed: Mar. 3, 2000

(30) Foreign Application Priority Data

Mar. 5, 1999 (JP) ..... 11-058475

(51) Int. Cl.[7] ..... G01S 3/16
(52) U.S. Cl. ..... 342/378; 342/382
(58) Field of Search ..... 342/368, 378, 342/382

(56) References Cited

U.S. PATENT DOCUMENTS 3,706,998 * 12/1972 Hatcher et al. ..... 343/754
4,551,727 * 11/1985 Cunningham ..... 343/418
4,575,724 * 12/1972 Wiener ..... 343/383

* cited by examiner

*Primary Examiner*—Thomas H. Tarcza
*Assistant Examiner*—Dao L. Phan
(74) *Attorney, Agent, or Firm*—Sughrue, Mion, Zinn, Macpeak & Seas, PLLC

(57) ABSTRACT

An array antenna is composed of an antenna section, adaptive transmission sections $\mathbf{3}_{-1}$ to $\mathbf{3}_{-M}$, and a transmission antenna weight-producing section 4. The antenna section has antenna elements $\mathbf{2}_{-11}$ to $\mathbf{2}_{-MN}$ arranged linearly on each of sides or sectors of M in a polygon. The adaptive transmission sections form a directional pattern having a gain in the direction of a desired signal for each sector and send a desired signal. The transmission antenna weight-producing section produces transmission antenna weights of M for each sector. A directional pattern having a high transmission gain roughly proportional to the number of antenna elements near a direction vertical to a straight line can be formed.

9 Claims, 4 Drawing Sheets

ARRAY ANTENNA TRANSMITTER WITH A HIGH TRANSMISSION GAIN PROPORTIONAL TO THE NUMBER OF ANTENNA ELEMENTS

BACKGROUND OF THE INVENTION

This invention relates to a transmitter having an array antenna which is composed of a plurality of antenna elements.

A transmitter is known which has an array antenna composed of a plurality of antenna elements. Such a transmitter will be called an array antenna transmitter which may be used in a cellular mobile communication system. The array antenna transmitter forms a directional pattern by which a maximum transmission gain is obtained in concern to a direction of arrival of a desired or a reception signal, in order to prevent the array antenna transmitter from interference on transmission.

In a conventional array antenna transmitter, the antenna elements are arranged circularly to form the directional pattern of transmission gain that is almost uniform in every direction. As a result, it is difficult to obtain a high transmission gain proportional to the number of antenna elements, as will be described later.

SUMMARY OF THE INVENTION

It is therefore an object of this invention to provide an array antenna transmitter capable of obtaining a high transmission gain proportional to the number of antenna elements.

Other objects of this invention will become clear as the description proceeds.

According to this invention, there is provided an array antenna transmitter comprising (A) an array antenna comprising a polygon having sides of M, sectors of M established on the sides, respectively, antenna elements of N arrayed linearly on each of the M sectors, where M is a positive integer which is not less than three, and N is a positive integer which is not less than one, (B) transmission antenna weight-producing means for producing transmission antenna weights for each of the sectors of M in accordance with an input information on an estimated direction of arrival of received signal, and (C) adaptive transmission means of M supplied with transmission signals for respective users and corresponding ones of the transmission antenna weights for supplying antenna transmission signals of N to a corresponding one of the antenna elements, the antenna transmission signals of N being used to transmit desired wave signals having directional patterns with gains in the directions of the users.

DESCRIPTION OF THE PREFERRED EMBODIMENT

Figure 1:
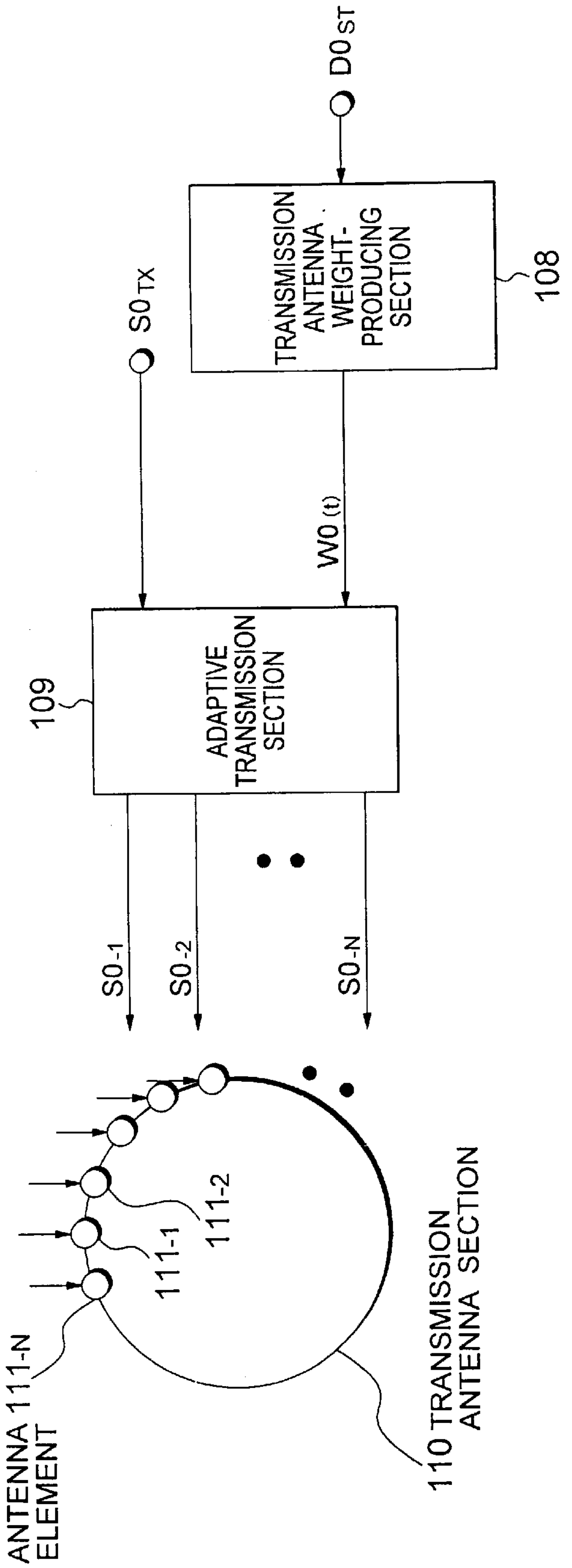
FIG. 1 PRIOR ART
FIG. 1 is a block diagram of a conventional array antenna transmitter.

Referring to FIG. 1, description will first be made as regards a convention array antenna transmitter for a better understanding of this invention. The illustrated array antenna transmitter may use code division multiple access (CDMA). The array antenna transmitter comprises a transmission antenna weight-producing section 108, an adaptive transmission section 109, and a transmission antenna section 110 having antenna elements $\mathbf{111}_{-1}$ to $\mathbf{111}_{-N}$ arranged circularly, where N is a positive integer which is not less than one.

The transmission antenna weight-producing section 108 calculates transmission antenna weight information (steering vector) $\mathbf{W0}_{(t)}$ on the basis of a direction of arrival $D0_{ST}$ of received signal estimated separately to form a directional pattern having a gain in the direction of arrival of the received signal. The adaptive transmission section 109 is supplied with the transmission antenna weight information $\mathbf{W0}_{(t)}$ and a user transmission signal $\mathbf{S0}_{TX}$ to produce antenna transmission signals $\mathbf{S0}_{-1}$ to $\mathbf{S0}_{-N}$. The transmission antenna section 110 comprises antenna elements $\mathbf{111}_{-1}$ to $\mathbf{111}_{-N}$ arranged circularly. No limitations are imposed on the directivity within a horizontal plane of each antenna element $\mathbf{111}_{-1}$ to $\mathbf{111}_{-N}$. Examples include omnidirectional and dipole antennas and the like.

The antenna transmission signals $\mathbf{S0}_{-1}$ to $\mathbf{S0}_{-N}$ are supplied to the transmission antenna section 110. The transmission antenna section 110 carries out transmission by means of the antenna elements $\mathbf{111}_{-1}$ to $\mathbf{111}_{-N}$ arranged close to each other such that each signal transmitted from the antenna has correlation. When the transmission antenna section 110 transmits by the antenna elements $\mathbf{111}_{-1}$ to $\mathbf{111}_{-N}$, processing is performed in an analog manner in the radio-frequency band. Therefore, the antenna transmission signals $\mathbf{S0}_{-1}$ to $\mathbf{S0}_{-N}$ are converted from the baseband to the radio-frequency band and are subjected to digital/analog conversion.

Figure 2:
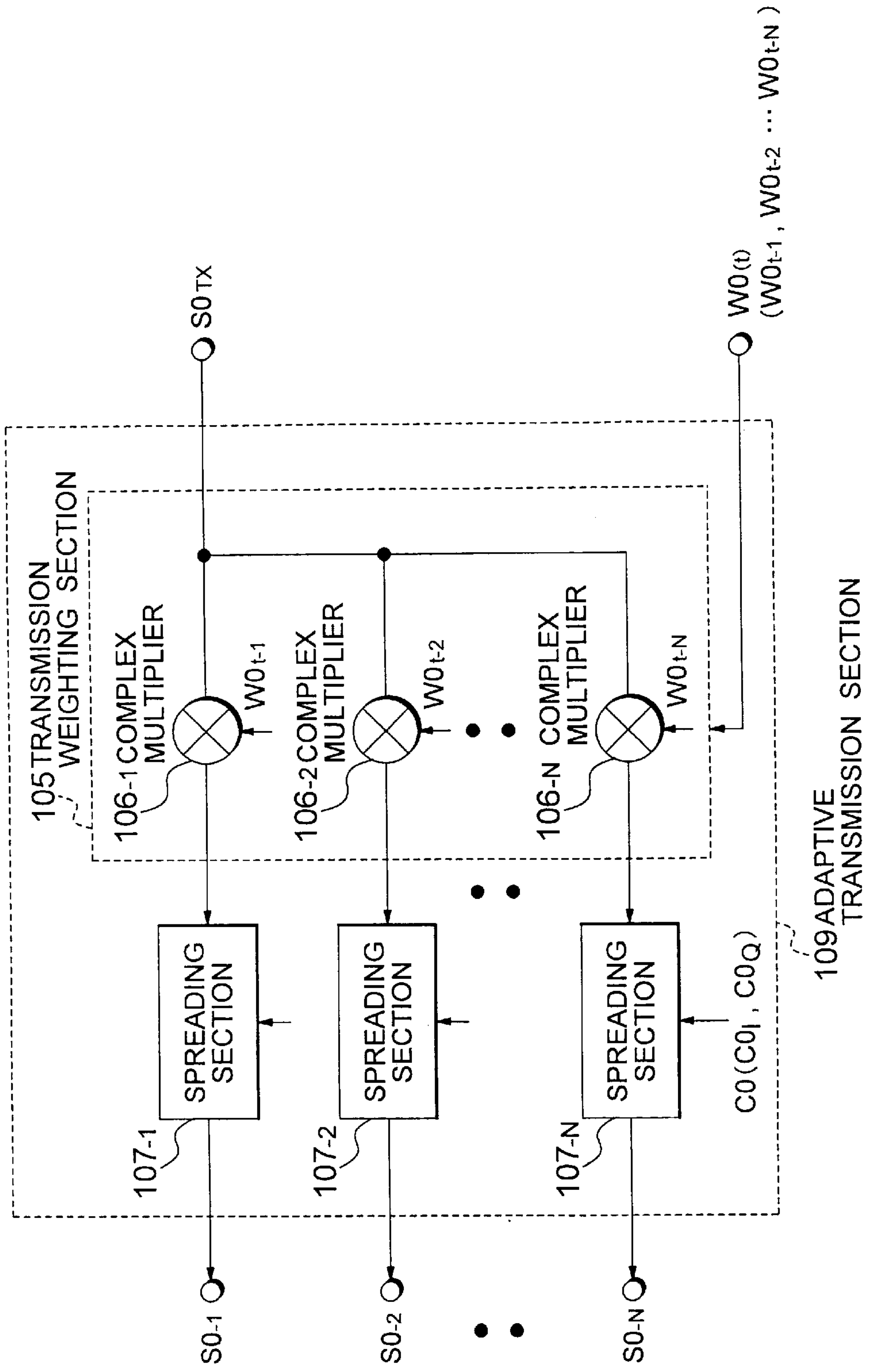
FIG. 2 PRIOR ART
FIG. 2 is a block diagram of an adaptive transmission section used in the array antenna transmitter illustrated in FIG. 1.

Referring to FIG. 2, the adaptive transmission section 109 comprises a transmission-weighting section 105 and spreading sections $\mathbf{107}_{-1}$ to $\mathbf{107}_{-N}$. The adaptive transmission section 109 is supplied with the transmission antenna weight information $W_{(t)}$ and the user transmission signal $\mathbf{S0}_{TX}$ which is inputted from an external section, in order to produce antenna transmission signals $\mathbf{S0}_{-1}$ to $\mathbf{S0}_{-N}$. The transmission-weighting section 105 comprises complex multiplication sections $\mathbf{106}_{-1}$ to $\mathbf{106}_{-N}$. The transmission-weighting section 105 multiplies the transmission signal $\mathbf{S0}_{TX}$ by transmission antenna weight information $W_{(t)}$ ($\mathbf{W0}_{t-1}$ to $\mathbf{W0}_{t-N}$) to produce a signal with a predetermined transmission directional pattern.

The spreading sections $\mathbf{107}_{-1}$ to $\mathbf{107}_{31\ N}$ spread the outputs of the transmission-weighting section 105 by a spreading code $C_0$ to produce the antenna transmission signals $\mathbf{S0}_{31\ 1}$ to $\mathbf{S0}_{-N}$. It will be assumed that the spreading code $C_0$ consists of two sequences of codes $C_{01}$ and $\mathbf{C0}_{0Q}$ mutually orthogonal to each other. The spreading sections $\mathbf{107}_{-1}$ to $\mathbf{107}_{-N}$ may be realized by a single complex multiplier and an averaging circuit over a symbol interval. Furthermore, the spreading sections $\mathbf{107}_{-1}$ to $\mathbf{107}_{-N}$ may be realized by a transversal filter configuration having tap weights of the spreading code $C_0$.

The array antenna transmitter illustrated in FIG. 1 uses an antenna having a circular array of antenna elements in forming a directional pattern for transmission. Therefore, the formed directional pattern of transmission gain is almost uniform among every direction.

In the array antenna transmitter illustrated in FIG. 1, the antenna elements are arranged circularly to form a directional pattern of transmission gain that is almost uniform among every direction. Consequently, the transmission gain is not optimized. It is difficult to obtain a high transmission gain proportional to the number of antenna elements.

Figure 3:
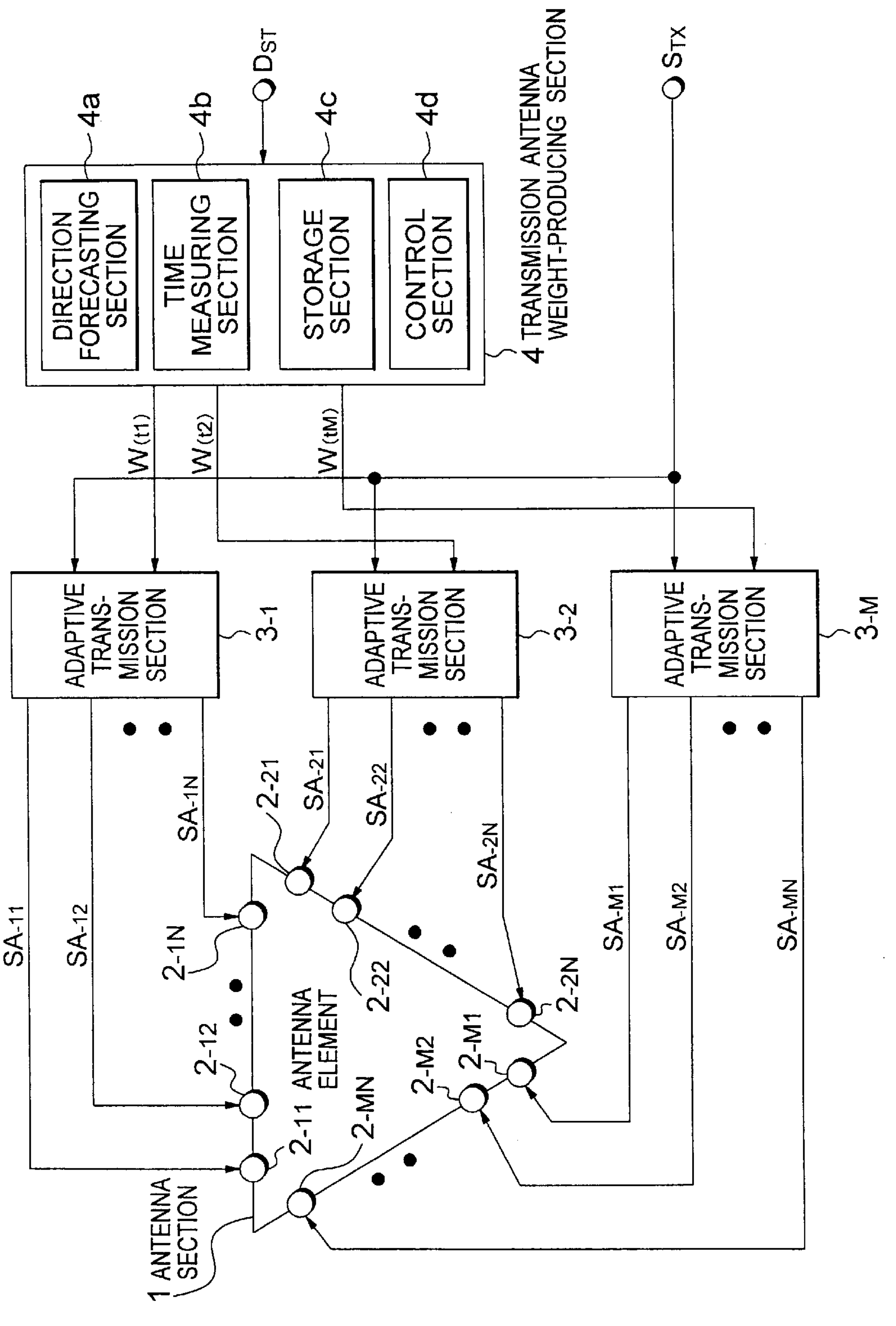
FIG. 3 is a block diagram of an array antenna transmitter according to a preferred embodiment of this invention.

Referring to FIG. 3, description will proceed to an array antenna transmitter according to a preferred embodiment of this invention. In the example being illustrated, the array antenna transmitter has an antenna section with a polygon having M sides sectors, where M is a positive integer which is not less than three. The number of antenna elements per sector is N, where N is a positive integer which is not less than one. The array antenna transmitter comprises an antenna section 1, adaptive transmitter sections $\mathbf{3}_{-1}$ to $\mathbf{3}_{-M}$, and a transmission antenna weight-producing section 4.

The antenna section 1 is shaped in the form of a polygon having sides of M. As mentioned previously, the antenna elements are arranged on the sides sectors. An arbitrary m-th sector is taken as an example in the following description, where m is a variable between one to M, both inclusive. The antenna section 1 is composed of antenna elements $\mathbf{2}_{-m1}$ to $\mathbf{2}_{-mN}$ such that elements of N are arranged linearly from the first sector to the M-th sector. The antenna elements $\mathbf{2}_{-m1}$ to $\mathbf{2}_{-mN}$ on the m-th sector are disposed close to each other in such a way that the antenna transmission signals on the m-th sector have correlation, in order to transmit a signal produced by code-multiplexing a desired signal with plural interference signals.

No limitations are placed on the in-plane directivity of each element of the antenna elements $\mathbf{2}_{-m1}$ to $\mathbf{2}_{-mN}$. Preferably, they are monopole elements having a beam width of less than 180 degrees. Where the directivity of the antenna elements $\mathbf{2}_{-m1}$ to $\mathbf{2}_{-mN}$ is monopolar, i.e., the beam width is less than 180 degrees, it is necessary to arrange the antenna elements $\mathbf{2}_{-m1}$ to $\mathbf{2}_{-mN}$ such that directivity is formed outside the polygon of the antenna section 1. Where the directivity of the antenna elements $\mathbf{2}_{-m1}$ to $\mathbf{2}_{-mN}$ is such that the beam width is other than monopolar with beam width of less than 180 degrees (e.g., omni and dipole), it is necessary to place an electromagnetic shielding material inside the polygon M of the antenna section 1 to prevent the antenna elements $\mathbf{2}_{-m1}$ to $\mathbf{2}_{-mN}$ from sending signals with directivities inside the m-th side (m-th sector) of the polygon M of the antenna section 1.

When signals are transmitted by the antenna elements $\mathbf{2}_{-m1}$ to $\mathbf{2}_{-mN}$ of the m-th sector of the antenna section 1, they are processed in an analog fashion in the RF band and so the antenna-transmitted signals $SA_{-m1}$ to $SA_{-mN}$ are frequency-converted from the baseband to the RF band. Thus, digital to analog conversion is performed.

The transmission directional pattern formed for each sector is formed at will within a transmission angular range of 180 degrees ahead of the antenna array within the sector by arranging the antenna elements as described above. In this case, the transmission angular range is 180 degrees regardless of M, unlike a transmission sector antenna whose transmission angular range varies according to the number of sectors.

The transmission antenna weight-producing section 4 comprises a direction-forecasting section 4*a* for forecasting the direction of a user to which a signal is to be sent, a time-measuring section 4*b* for measuring time, a storage section 4*c* for storing various kinds of information, and a control section 4*d*. The transmission antenna weight-producing section calculates transmission antenna weight information (steering vector) $W_{(t1)}$ to $W_{(tM)}$ for forming directional patterns with gains in the direction of arrival of received signal for each sector from the separately estimated received signal arrival direction information $D_{ST}$. No limitations are imposed on the method of estimating the direction of arrival when the estimated received signal arrival direction (estimated received signal arrival direction information $D_{ST}$) is found. Examples include spatial DFT method and MUSIC method and the like.

Furthermore, in the transmission antenna weight-producing section 4, no limitations are imposed on the method of selecting sectors for detecting the m-th sector transmission antenna weight. Examples include a method of determining the transmission antenna weight by selecting only one sector including an estimated direction of arrival of received signal, a method of determining the transmission antenna weight by selecting all sectors including an estimated direction of arrival of received signal, a method of determining the transmission antenna weight by forecasting the direction of a user at a transmission instant of time from an estimated direction of arrival of received signal and then selecting only one sector including the estimated direction of the user, and a method of determining the transmission antenna weight by forecasting the direction of a user at a transmission instant of time from an estimated direction of arrival of received signal and then selecting all sectors including the forecasted direction of the user and the like.

In the transmission antenna weight-producing section 4, it is possible to perform a weighting operation for each different sector when plural sectors are selected and transmission antenna weights are determined. For instance, as a direction normal to a straight line on which antenna elements are arranged on a sector for which an estimated direction of arrival of received signal or forecasted direction of user is selected is approached, the weight attached to the sector is increased. In this way, an optimal ratio combining method is implemented. Note that undetermined transmission antenna weights are all null and transmission is not done.

No limitations are imposed on the receiver system as long as the direction of arrival of receiving signal is estimated. During transmission, the directional pattern is formed independent of other sectors. The transmission antenna weight for each sector can be determined at will by the transmission antenna weight-producing circuit.

Figure 4:
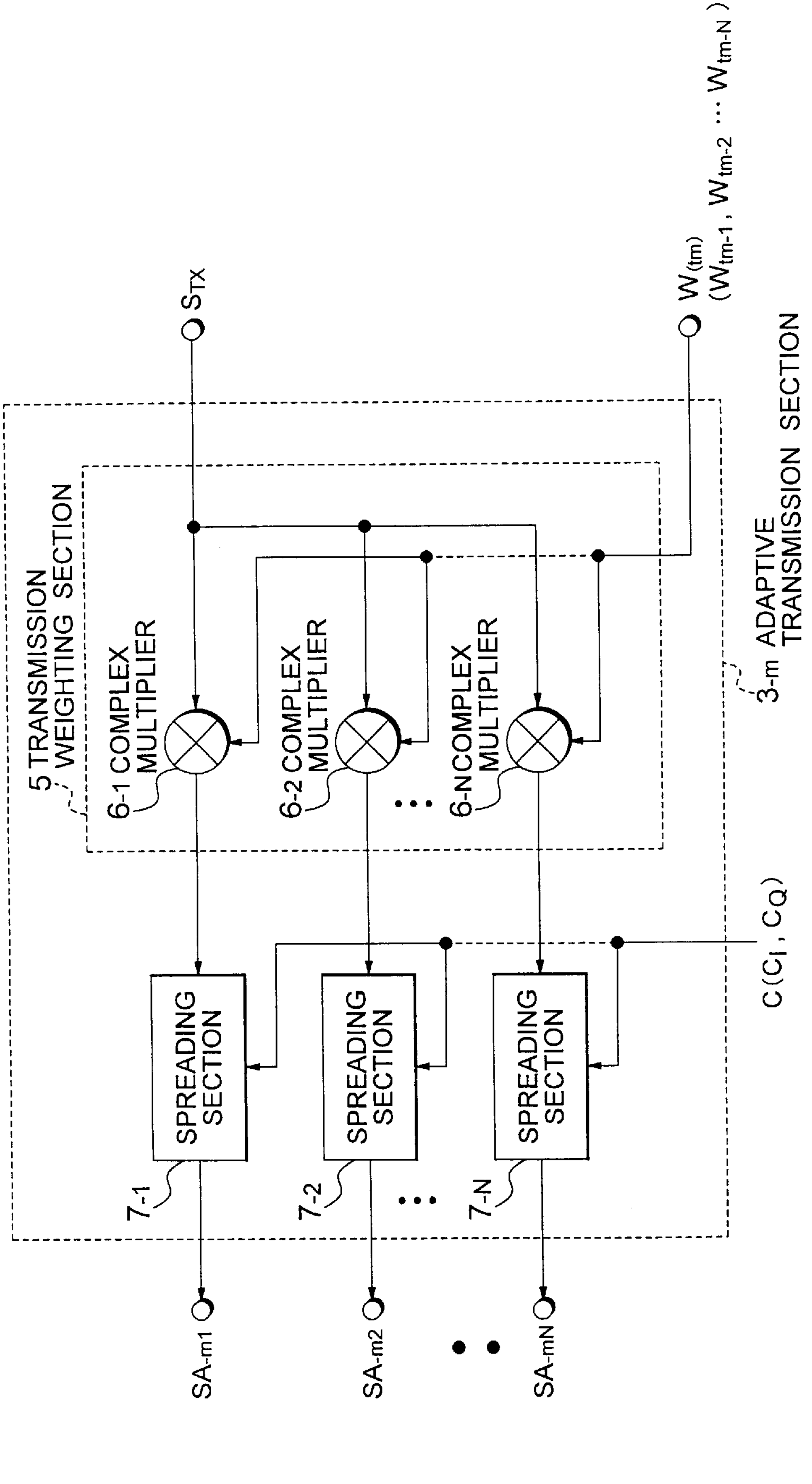
FIG. 4 is a block diagram of an adaptive transmission section used in the array antenna transmitter illustrated in FIG. 3.

Referring to FIG. 4, an adaptive transmitter section $\mathbf{3}_{-m}$ is composed of a transmission-weighting section 5 and spreading sections $\mathbf{7}_{-1}$ to $\mathbf{7}_{-N}$. The m-th sector transmission antenna weight information $W_{(tm)}$ ($W_{tm-1}$ to $W_{tm-N}$) and the user transmission signal $S_{TX}$ are supplied to the adaptive transmitter section $\mathbf{3}_{-m}$. The antenna transmission signals $SA_{-m1}$ to $SA_{-mN}$ are outputted from each individual sector. The transmission-weighting section 5 comprises complex multiplier sections $\mathbf{6}_{-1}$ to $\mathbf{6}_{-N}$, which multiply the user transmission signal $S_{TX}$ by the transmission antenna weight information $W_{(tm)}$. The transmission-weighting section 5 produces a signal sent in a transmission directional pattern intrinsic to the user.

The spreading sections $\mathbf{7}_{-1}$ to $\mathbf{7}_{-N}$ spread the outputs of the transmission-weighting section 5 by a spreading code C to produce antenna transmission signals $SA_{-m1}$ to $SA_{-mN}$. It will be assumed that the spreading code C is a complex code consisting of two sequences of codes $C_I$ and $C_Q$ orthogonal to each other. The spreading sections $\mathbf{7}_{-1}$ to $\mathbf{7}_{-N}$ can be realized by a single complex multiplier and an averaging circuit over a symbol interval. The spreading sections $\mathbf{7}_{-1}$ to $\mathbf{7}_{-N}$ can also be accomplished by a transversal filter configuration with tap weight of C.

It is to be noted that the information $D_{ST}$ about the estimated direction of arrival of received signal is only one in this example. A transmission directional pattern in one direction is formed for each one user. It is also possible to prepare plural transmission antenna weight-producing sections 4 illustrated in FIG. 3. The m-th sector transmission antenna weight outputted from the transmission antenna weight-producing sections 4 may be summed up for each sector, in order to form transmission directional patterns corresponding to plural estimated directions of arrival of received signals.

In this configuration, the antenna elements $\mathbf{2}_{-m1}$ to $\mathbf{2}_{-mN}$ are arranged on a line for each sector. Therefore, a directional pattern having a high transmission gain that proportionated roughly with the number of antenna elements can be formed near a direction vertical to the line on which the antenna elements $\mathbf{2}_{-m1}$ to $\mathbf{2}_{-mN}$ are arranged.

In this invention, no limitations are placed on the code length of the spreading code C, i.e., on the spreading factor. Therefore, the array antenna transmitter in accordance with this invention can be applied to signals multiplexed by a method other than a code division multiplexing method, for example, with a spreading factor of 1.

Furthermore, in this invention, no limitations are placed on the spacing between the antenna elements. As an example, the spacing between the antenna elements is half of the wavelength of the carrier wave.

This invention has another feature as described below. No limitations are placed on the number of sectors M. One example is a triangle as in the above embodiment. In addition, no limitations are placed on the number of antenna elements N arranged linearly on one sector.

In this invention, no limitations are imposed on the number of users to which signals are sent simultaneously. Furthermore, no limitations are placed on the number of directions of signals transmitted simultaneously per user.

As described above, according to this invention, antenna elements are arranged linearly on each side of a polygon. A signal supplied to an antenna is controlled for each individual side. Thus, the directivity is controlled. Consequently, an array antenna transmitter system that can have a high transmission gain proportional to the number of antenna elements without interference to other users can be accomplished.

In this invention, antenna elements are arranged on a straight line on each sector and so a directional pattern having a high transmission gain approximately proportional to the number of antenna elements can be formed near a direction vertical to each side or sector of a polygon.

What is claimed is:

1. An array antenna transmitter comprising:

an array antenna comprising a polygon having sides of M, sectors of M established on said sides, respectively, antenna elements of N arrayed linearly on each of the M sectors, where M is a positive integer which is not less than three, and N is a positive integer which is not less than one;

a transmission antenna weight-producing means for producing transmission antenna weights for each of said sectors of M in accordance with an input information on an estimated direction of arrival of received signal; and adaptive transmission means of M supplied with transmission signals for respective users and corresponding ones of said transmission antenna weights for supplying antenna transmission signals of N to a corresponding one of said antenna elements, said antenna transmission signals of N being used to transmit desired wave signals having directional patterns with gains in the directions of said users.

2. An array antenna transmitter as claimed in claim 1, wherein the directional pattern on each of said sectors of M is formed only outside of each side of said polygon corresponding to said sectors of M.

3. An array antenna transmitter as claimed in any one of claims 1 and 2, wherein said transmission antenna weight-producing means produces a transmission antenna weight for each of said sectors of M by selecting one sector including said estimated direction of arrival of received signal from said sectors of M.

4. An array antenna transmitter as claimed in any one of claims 1 and 2, wherein said transmission antenna weight-producing means produces the transmission antenna weight for each of said sectors of M by selecting all sectors including said estimated direction of arrival of received signal from said sectors of M.

5. An array antenna transmitter system as claimed in any one of claims 1 and 2, wherein said transmission antenna weight-producing means produces a transmission antenna weight for each of said sectors M by forecasting directions of users at a predetermined transmission instant of time from said estimated direction of arrival of received signal and selecting one sector including the forecasted direction of user from said sectors of M.

6. An array antenna transmitter as claimed in any one of claim 1 or 2, wherein said transmission antenna weight-producing means produces the transmission antenna weight for each of said sectors of M by forecasting directions of users at a predetermined transmission instant of time from said estimated direction of arrival of received signal and selecting all sectors including the forecasted direction of user from said sectors of M.

7. An array antenna transmitter as claimed in claim 1, wherein each of said adaptive transmitter means comprises:

transmission-weighting means for forming a directional pattern at said array antenna according to said transmitted signals for given users and said transmission antenna weights supplied from said transmission antenna weight-producing means; and spreading means of N for supplying said antenna transmission signals of N to said antenna elements of N, respectively, said antenna transmission signals of N being obtained by spreading outputs from said transmission-weighting means using spreading codes corresponding to given users.

8. An array antenna transmitter as claimed in claim 7, wherein said transmission-weighting means has complex multiplication means of N that are supplied with said transmission antenna weights and with said transmission signal for said given user, said transmission-weighting means finding the product of said transmission signal and a corresponding one of complex transmission antenna weights N contained in said transmission antenna weights.

9. An array antenna transmitter as claimed in claim 2, wherein each of said adaptive transmitter means comprises:

transmission-weighting means for forming a directional pattern at said array antenna according to said transmitted signals for given users and said transmission antenna weights supplied from said transmission antenna weight-producing means; and spreading means of N for supplying said antenna transmission signals of N to said antenna elements of N, respectively, said antenna transmission signals of N being obtained by spreading outputs from said transmission-weighting means using spreading codes corresponding to given users.

* * * * *

UNITED STATES PATENT AND TRADEMARK OFFICE

CERTIFICATE OF CORRECTION

PATENT NO. : 6,218,988 B1
DATED : April 17, 2001
INVENTOR(S) : Yasushi Maruta

It is certified that error appears in the above-identified patent and that said Letters Patent is hereby corrected as shown below:

<u>Column 2,</u>
Line 49, delete "$107_{31\ N}$" insert -- $107_{-N}$ --;
Line 52, delete "$S0_{31\ 1}$" insert -- $S0_{-1}$ --

Signed and Sealed this

Twenty-ninth Day of January, 2002

*Attest:*

JAMES E. ROGAN

*Attesting Officer*

*Director of the United States Patent and Trademark Office*